March 18, 1952     J. C. HAWKINS     2,590,011
HYDRAULICALLY OPERATED LIFT FOR TRACTORS Filed Sept. 2, 1948     7 Sheets-Sheet 1

Inventor:
JESSE C. HAWKINS.

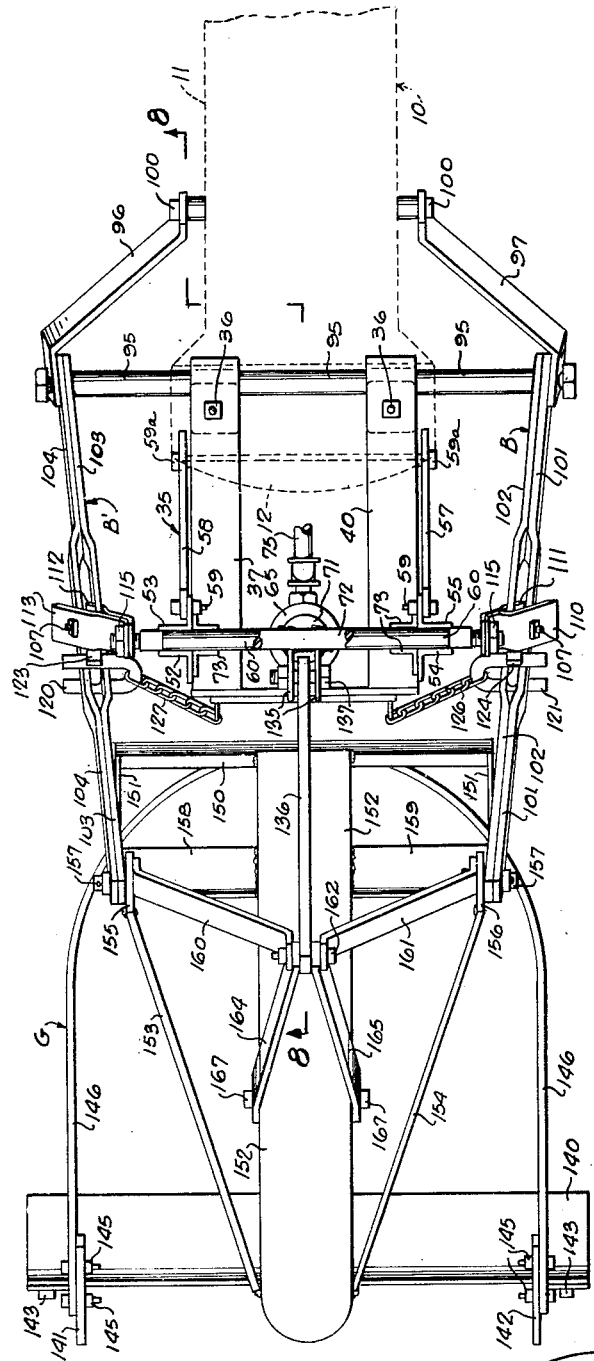

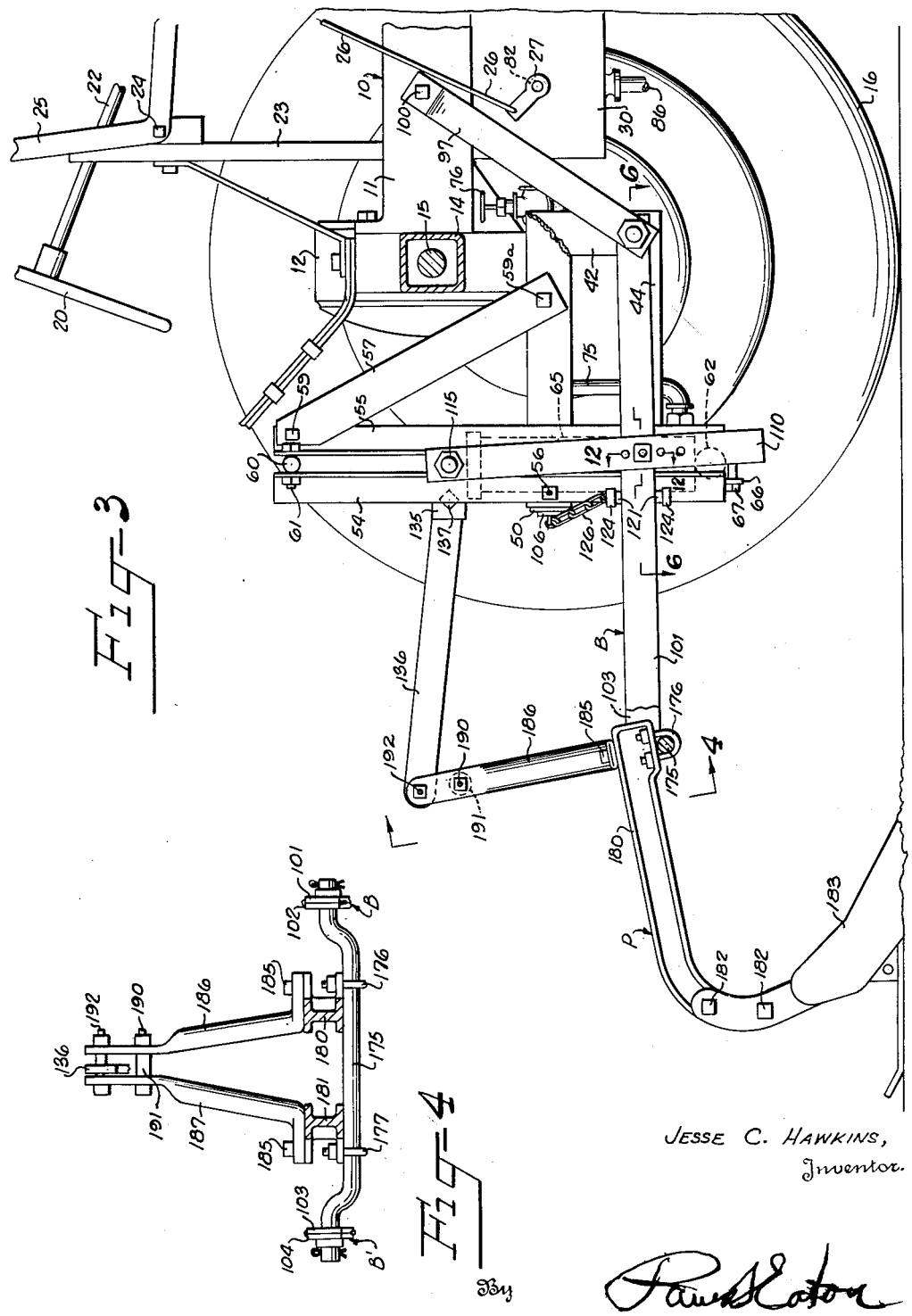

March 18, 1952 J. C. HAWKINS 2,590,011
HYDRAULICALLY OPERATED LIFT FOR TRACTORS
Filed Sept. 2, 1948 7 Sheets-Sheet 4

JESSE C. HAWKINS,
Inventor.

By
Attorney

March 18, 1952 J. C. HAWKINS 2,590,011
HYDRAULICALLY OPERATED LIFT FOR TRACTORS
Filed Sept. 2, 1948 7 Sheets-Sheet 5
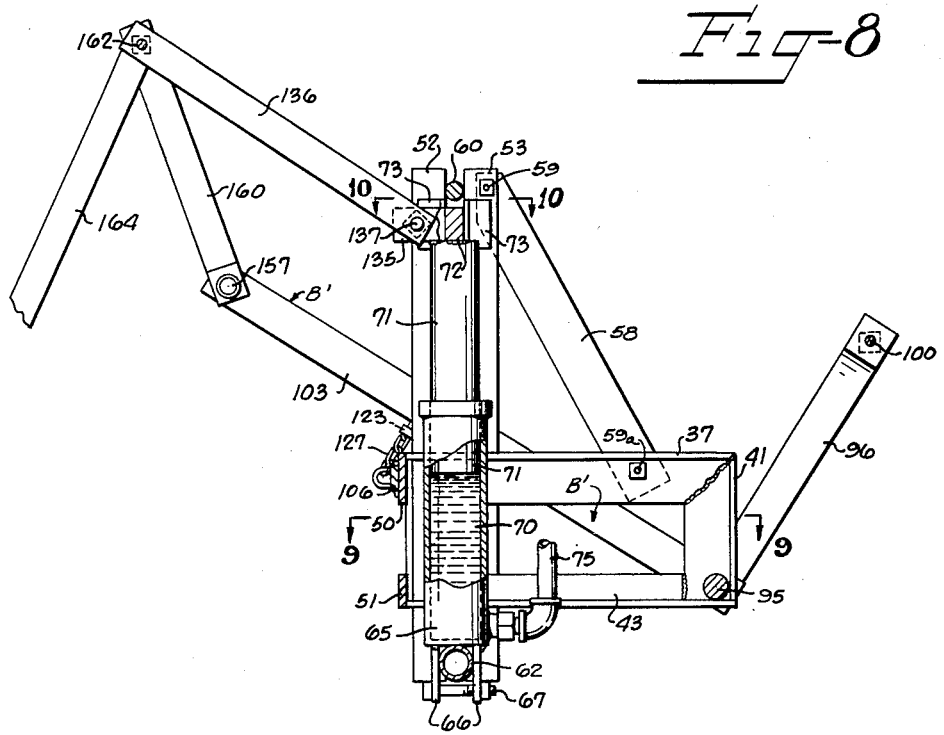
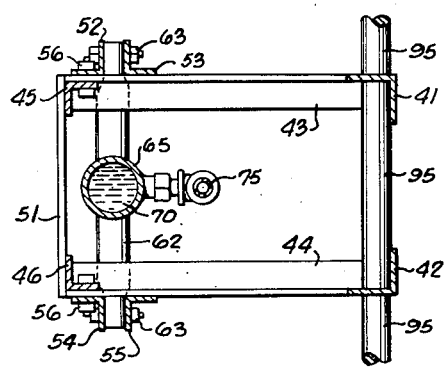
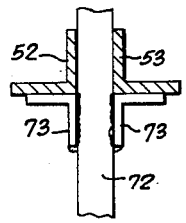
JESSE C. HAWKINS,
Inventor
Attorney

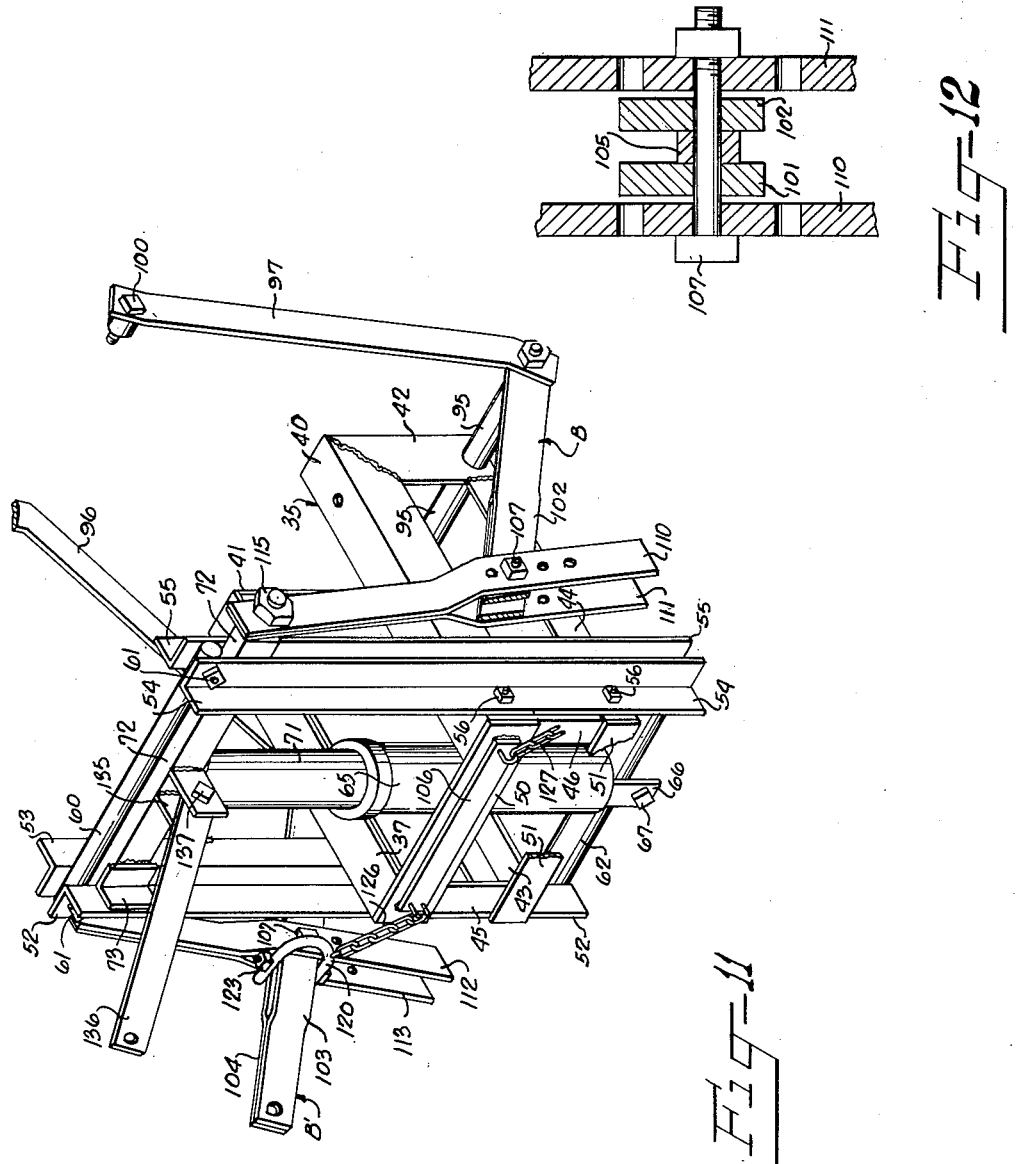

March 18, 1952  J. C. HAWKINS  2,590,011
HYDRAULICALLY OPERATED LIFT FOR TRACTORS
Filed Sept. 2, 1948  7 Sheets-Sheet 7
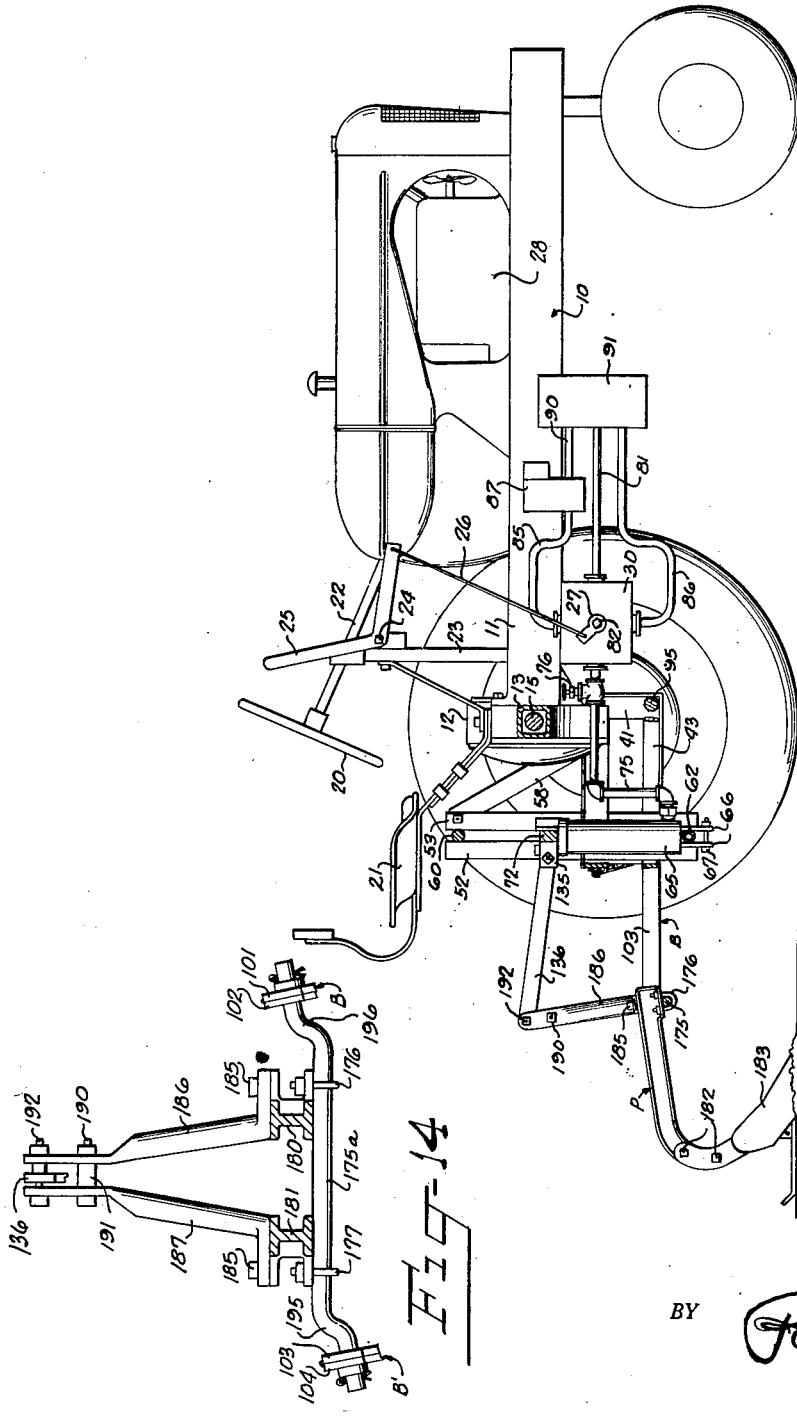
JESSE C. HAWKINS,
INVENTOR.
BY
ATTORNEY.

Patented Mar. 18, 1952

2,590,011

UNITED STATES PATENT OFFICE 2,590,011

HYDRAULICALLY OPERATED LIFT FOR TRACTORS

Jesse C. Hawkins, Legerwood, N. C.

Application September 2, 1948, Serial No. 47,469

8 Claims. (Cl. 97—50)

1

This invention relates to a hydraulically operated lift for tractor drawn detachable implements.

It is an object of this invention to provide a hydraulic lift which may be mounted between the rear wheels of a tractor and having means thereon for attaching agricultural implements thereto, whereby the entire implement may be raised and lowered relative to the tractor, as desired.

It is another object of this invention to provide a framework for attaching to a tractor between the rear wheels thereof and said framework having lever arms mounted on the same in parallel relation to each other with one end of one of the arms being connected to a hydraulically operated ram whereby an implement such as a plow or the like may be secured to the lever arms and may thus be raised and lowered by the hydraulic ram relative to the tractor and the implement will maintain a similar attitude regardless of its elevation relative to the tractor.

Heretofore, lifts for agricultural implements have had their rear ends rigidly connected to the front end of the implement, such as a plow, so as the plow is raised, the angle of attack of the plow point has been increased, thus causing the plow to tend to go deeper into the ground. By the means employed in my lift, the whole implement and beam are raised at the same rate, thus overcoming the above defects.

Some of the objects of the invention having been stated, other objects will appear as the description proceeds, when taken in connection with the accompanying drawings, in which Figure 1 is a side elevation of the rear portion of a tractor, omitting one of the wheels and showing the invention applied thereto;

Figure 2 is a top plan view of the structure shown in Figure 1;

Figure 3 is a view similar to Figure 1 but showing a different type of implement connected to the rearmost end of the apparatus;

Figure 4 is an elevation with parts in section and being taken substantially along the line 4—4 in Figure 3;

Figure 8 is an elevation with parts in section

2 and being taken along the line 8—8 in Figure 2, but omitting the tractor;

Figure 9 is a sectional plan view taken along the line 9—9 in Figure 8;

Figure 10 is a sectional plan view taken along the line 10—10 in Figure 8;

Figure 11 is an isometric view showing the lifting structure with various parts broken away for purposes of clarity;

Figure 12 is a vertical sectional view taken substantially along the line 12—12 in Figure 3;

Figure 13 is a view showing the pump, expansion tank, control valve, ram, and piping mounted on a tractor and showing the rear portion thereof in section;

Figure 14 is a view similar to Figure 4 but showing a different type of cross bar to which the implement is secured.

Figure 1:
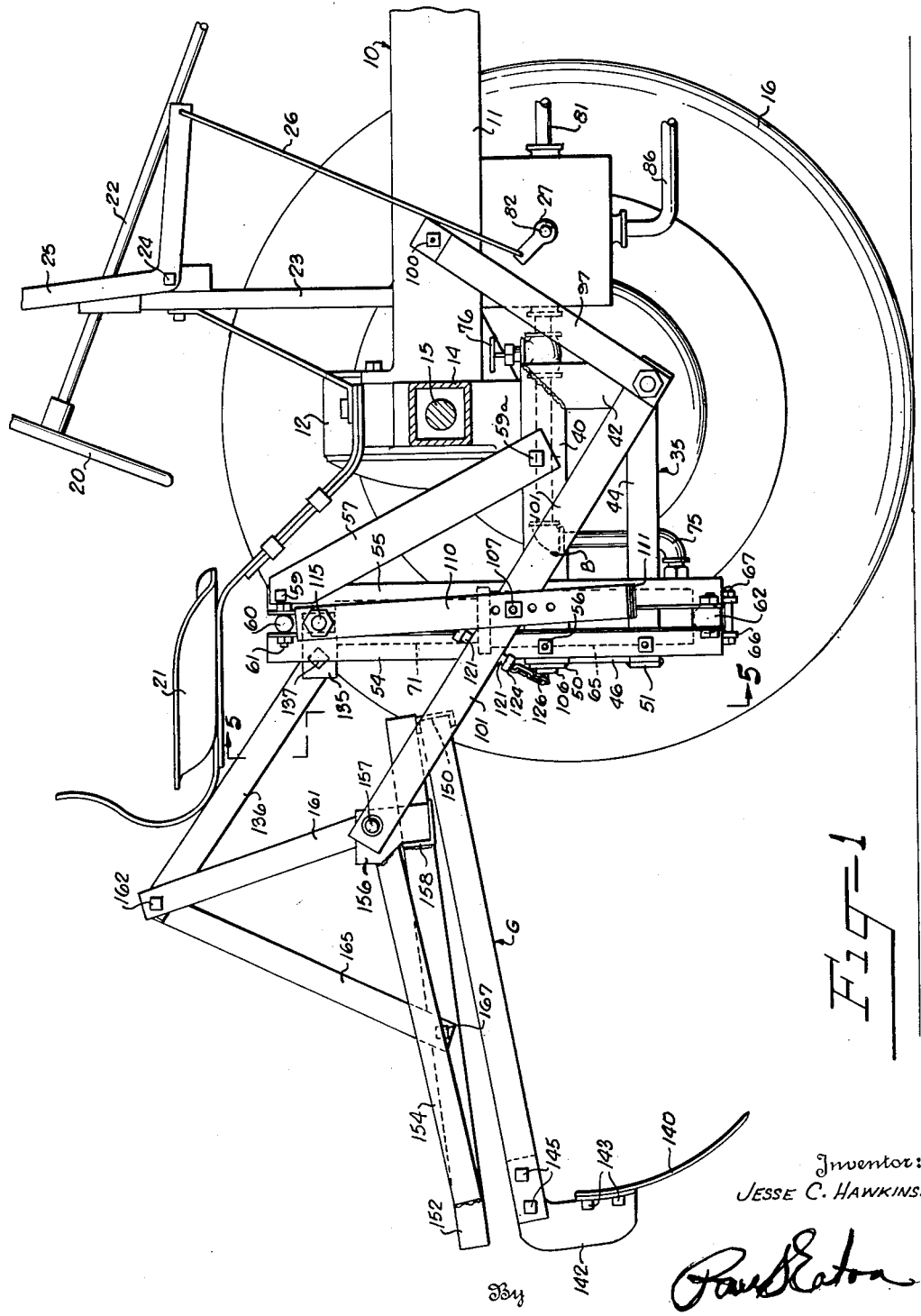

Referring more specifically to the drawings, the numeral 10 broadly designates a suitable tractor having a longitudinally extending frame 11, the rear end of which terminates at a differential gear casing 12 having transverse axle housings 13 and 14 extending therefrom, in which conventional axles 15 are journaled (Figure 1). The axles 15 are connected at their ends to rear drive wheels 16, only one of which is shown in the drawings. The axles are connected to the wheels 16 by conventional gear housings, so the wheels 16 are eccentrically mounted adjacent opposite ends of the axle housings 13 and 14.

The tractor 10 also has a steering wheel 20 and an operator's seat 21. The steering wheel 20 is mounted on a steering column 22, which is supported intermediate its ends by a vertically disposed standard 23, the standard 23 also having pivoted thereto as at 24, a manually operable bell crank control lever 25, which is connected by a rod 26 with a valve actuating lever 27 connected to a valve mechanism, to be later described, housed in a valve housing 30 secured, by conventional means, to the bottom of the longitudinally extending frame 11 of the tractor 10. The tractor also has a conventional internal combustion engine 28 mounted on the frame 11 (Figure 13).

Secured to the lower surface of the housing 12 of the tractor 10 by means of bolts 36 is the lifter frame structure broadly designated at 35. This structure comprises spaced rearwardly extending angle bars 37 and 40, which are penetrated by the bolts 36 at their right-hand ends in Figure 2. Angle bars 41 and 42 are welded to the right-hand ends of the bars 40 and 37, respectively, and extend downwardly therefrom and are welded at their lower ends to rearwardly extending angle bars 43 and 44, respectively, which are in parallel spaced relation to the angle bars 37 and 40 disposed thereabove.

The rear ends of the angle bars 43 and 37 and 44 and 40 are welded to connecting angle bars 45 and 46, respectively, which are spanned at their upper and lower ends by transverse bars 50 and 51 secured thereto as by welding.

Figure 5:
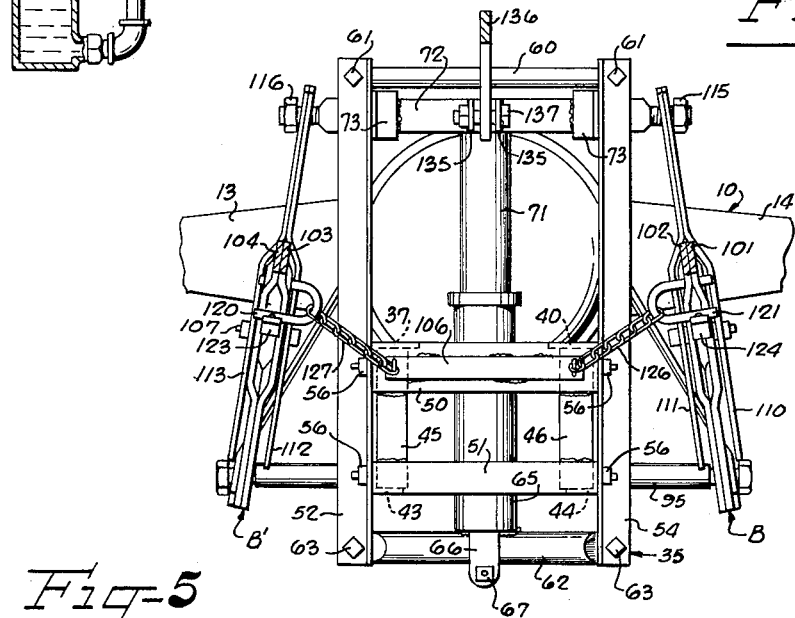
Figure 5 is an elevation with parts in section, showing the rear end of the apparatus, and being taken along the line 5—5 in Figure 1.

Secured as by bolts 56 to opposite sides of the angle bars 37 and 43 and 40 and 44, respectively, adjacent their rear ends, are guide members comprising spaced vertically disposed angle bars 52 and 53, and 54 and 55, respectively (Figures 1, 2, 3, 5 and 8). Angle braces 57 and 58 are provided, the upper ends of which are secured, as by bolts 59, to the upper ends of the angle bars 53 and 55, respectively, their lower ends being secured, as by screws 59a to the angle bars 37 and 40, respectively. The upper ends of the angle bars 52 and 53 and 54 and 55 are held in spaced relation to each other by a transverse bar 60 which spans the distance therebetween and is secured to the upper ends of the angle bars 52 and 53 and 54 and 55, by any suitable means such as bolts 61 (Figures 5 and 11). The partially flattened opposite ends of a tubular member 62 which spans the distance between the lower ends of the angle bars 52 and 54, are penetrated by a bolt 63 to thus secure the same to the angle bars 52 and 53 and 54 and 55 and thus serves to hold the lower ends of the angle bars 52, 53, 54 and 55 in spaced relation to each other.

Mounted on the tubular member 62 is the lower end of a cylinder 65 having downwardly extending spaced ears 66 welded to the same and which straddle the transverse tubular member 62 and are penetrated at their lower ends by a bolt 67 to thus clamp the lower end of the cylinder 65 to the transverse member 62.

The cylinder 65 has a suitable hydraulic fluid 70 therein and a hydraulic ram or piston 71 is mounted therein for vertical sliding movement. The upper end of the hydraulic ram 71 is welded to a transverse horizontally disposed bar 72, the opposite ends of which are mounted for vertical sliding movement between the angle bars 52 and 53 and 54 and 55. The bar 72 is prevented from having endwise movement between the angle bars 52 and 54 and 53 and 55 by angle clips 73 welded to the bar 72 and engaging proximate surfaces of the angle bars 52, 53, 54 and 55 (Figures 5 and 10). Communicating with the lower end of the cylinder 65 is a pipe 75 which extends rearwardly in Figures 7 and 8 and is connected to the housing 30 and has a suitable manually operable valve 76 therein. The valve housing 30 has ports 77, 78, 79 and 74 therein and also has a valve core 80 therein which is mounted for rotational movement in the valve housing 30 and is fixedly mounted on the transverse shaft 82 which extends outwardly from one side thereof and on which the valve actuating member 27, heretofore described, is fixedly mounted. The valve core 80 has passageways 83 and 84 therein, the passageway 83 being adapted to connect the ports 77 and 79 and the passageway 84 being adapted to connect the ports 78 and 74 when the parts are in the position shown in Figure 7 to allow the fluid to flow from cylinder 65 to the expansion tank 91. Port 74 has a pipe 81 leading therefrom to the expansion tank 91.

Figure 7:
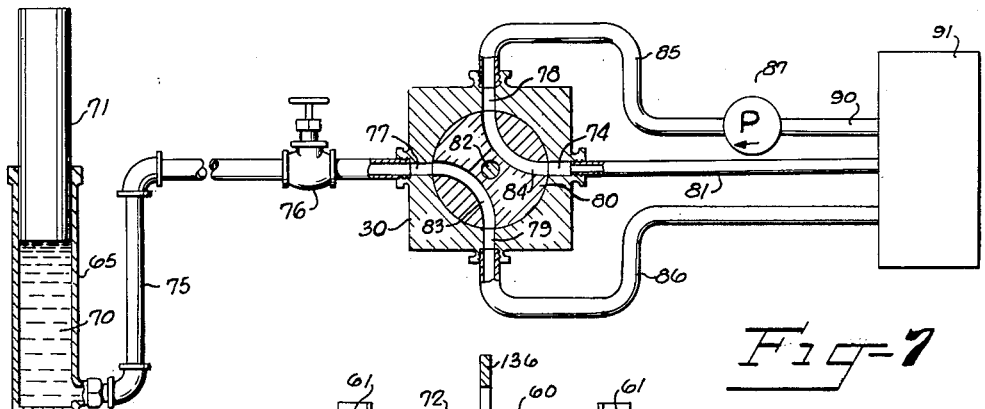
Figure 7 is a schematic diagram showing the hydraulically operated means for controlling the hydraulic ram.

One end of pipes 85 and 86 are connected to the housing 30 and cooperate with the ports 78 and 79 respectively. The pipe 85 is connected at its other end to a suitable hydraulic pump 87 which is a conventional part of a tractor and which is suitably driven by the engine 28 of the tractor. The pump 87 has a pipe 90 connected to the same which connects it with the expansion tank 91 (Figure 7). The pipe 86 extends from the valve housing 30 and is connected at its other end to the tank 91. It is thus seen that by means of the control lever 25, the valve member 80 may be partially rotated as desired to align the ports 77 and 78 with the passageway 84 to force fluid into the cylinder 65 and to also align the ports 77 and 79 with the passageway 83 as shown in Figure 7 to allow the fluid to return from the cylinder 65 to the expansion tank 91, at which time the fluid pumped by pump 87 will return to the tank 91 through pipe 81.

Now, when the valve core 80 is in the position shown in Figure 7, the hydraulic fluid 70 may escape through the pipe 75 and the valve 76, assuming that it is open and through the port 77 and the passageway 83 to the port 79 and thus through the pipe 86 to the expansion tank 91. Now, this will therefore permit the ram 71 to move downwardly under the weight of the structure connected thereto.

When it is desired to raise the ram 71, the valve core 80 is rotated in a counterclockwise direction in Figure 7 to thus align the passageway 84 with the ports 77 and 78 so the pump 87 will pump hydraulic fluid from the tank 91 through the pipe 90 through the pump 87 through the pipe 85, through the port 78, through the passageway 84, through the port 77, and through the pipe 75, assuming that the valve 76 is open, and thus to the lower end of the cylinder 65 and to thus cause the ram 71 to be moved upwardly.

A transverse shaft 95 penetrates the lower ends of the angle bars 41 and 42 and is welded thereto, and this shaft 95 extends outwardly a substantial distance from each side of the angle bars 41 and 42, and has one end of brace bars 96 and 97 connected to the same, which extend upwardly and inwardly toward each other and are fixedly secured as at 100, to opposite sides of the longitudinally extending portion 11 of the tractor 10 (Figure 2).

Figure 6:
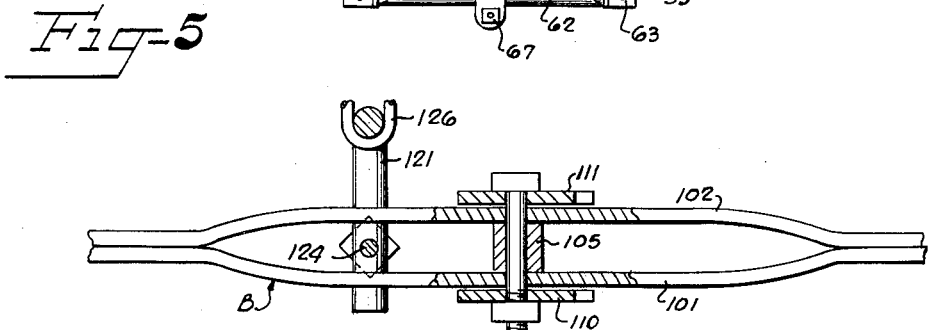
Figure 6 is a sectional plan view taken substantially along the line 6—6 in Figure 3.

Pivotally connected to opposite ends of the shaft 95 are the front ends of bars 101 and 102 and 103 and 104, respectively, which comprise booms B and B', respectively. The opposite ends of the bars 101 and 102, as well as the bars 103 and 104 are in juxtaposed relation to each other and are bent apart from each other at the medial portion thereof and the medial portions of the bars 101 and 102 and 103 and 104 are held in spaced relation to each other by suitable washers 105 (Figure 6).

The bars 101 and 102 and 103 and 104 are slidably penetrated by bolts 107 which also penetrate the associated washers 105 and engaging opposite sides of the bars 101 and 102 and 103 and 104, respectively, are the medial portions of support bars or links 110 and 111 and 112 and 113. The bars 110 and 111 extend upwardly and inwardly toward each other to where they are spot welded together and the uppermost ends of the same are swingably mounted on the restricted right-hand end of the vertically movable bar 72 in Figure 5. The bars 112 and 113 at the opposite side of the frame 35 are bent inwardly also toward each other and are spot welded to each other and their upper ends are loosely mounted on the restricted left-hand end of the vertically movable bar 72 in Figure 5. The opposite ends of the vertically movable bar 72 have nuts 115 and 116 threadably mounted thereon to thus prevent endwise movement of the upper end of the bars 110 and 111 and 112 and 113, respectively.

U-shaped clevises 120 and 121 (Figure 2) straddle the booms B' and B, respectively, and are penetrated by bolts 123 and 124 which pass between the bars 103 and 104 and 101 and 102, respectively. These U-shaped clevises 120 and 121 have the remote ends of link chains 127 and 126 respectively, connected thereto, the proximate ends of which are connected to opposite ends of a horizontally disposed bar 106 secured, as by welding, to the transverse bar 50. The purpose of these chains 126 and 127 is to permit the booms B and B' to move vertically relative to the fixed frame 35 and to also prevent excessive outward movement of the associated bars or links 110 to 113 inclusive.

The transverse bar 72 has spaced ears 135 welded to the medial portion thereof between which one end of a rearwardly extending link 136 is pivotally mounted as at 137 (Figure 11). The rearmost ends of the booms B and B' as well as the rear end of the link 136, are adapted to be connected to the desired earthworking implement, such as a scraper or plow or the like, and in Figures 1 and 2, the apparatus is shown connected to a suitable grading assembly device broadly designated at G and the apparatus is shown in Figure 3 connected to a suitable plow assembly P. These showings, the grading device and the plow, are typical installations and it is obvious that other modifications in the framework rearwardly of the booms B and B' and the arm 136 may be necessary depending upon the structure of the implement to be attached to the lifting device.

Referring to Figures 1 and 2, it may be observed that the grading device G comprises a grading blade 140 having cast brackets 141 and 142 connected to the same as by screws 143 and which are secured as by bolts 145 to the ends of a U-shaped draw bar 146 which extends forwardly and has a channel bar 150 welded to the front end thereof, the ends of which are welded to rearwardly extending brace bars 151 which extend rearwardly and are welded to the curved draw bar 146. The purpose of the channel bar 150 is to lend rigidity to the curved draw bar 146 so the grading device G will not tend to move from side to side inasmuch as opposite ends of the channel bar 150 may engage proximate sides of the booms B and B' as the grading device G is being carried in a raised position such as that shown in Figure 1. Welded to the transverse channel bar 150 at the medial portion thereof is the front end of a weight member 152 which extends rearwardly and has brace bars 153 and 154 welded to opposite sides thereof adjacent the rear end and extending forwardly and away from each other at an angle and their front ends are welded to plates 155 and 156, respectively. Welded to opposite side edges of the weight member 152 a substantial distance from its front end in Figure 2 are outwardly extending angle bars 158 and 159, the outer ends of which are welded to the lower ends of the plates 155 and 156, respectively.

The plates 155 and 156 are pivotally connected as at 157 to the rearmost ends of the booms B and B'. Also being pivotally connected at the point 157 are the lower ends of diverging bars 160 and 161 whose upper ends are pivotally connected by a bolt 162 to the rearmost end of the link 136. Also pivotally mounted on the bolt 162 are the upper ends of links 164 and 165 which extend downwardly and rearwardly away from each other and are secured by bolts 167 to the opposite sides of the weight member 152 intermediate its ends.

By referring to Figures 3 and 4, there may be observed the means for connecting the plow assembly P to the rear end of the frame structure 35. A transverse shaft 175 is oscillatably mounted in the rear ends of the booms B and B' and secured to the bar 175 by means of U-bolts 176 and 177 are the front ends of longitudinally extending draw bars 180 and 181, respectively, which are a conventional part of the plow assembly P and extend rearwardly and have secured to the same as by screws 182 a plow share 183.

Secured to the draw bars 180 and 181 as by bolts 185 are upwardly extending converging lever bars 186 and 187, which are secured together at their upper ends by a bolt 190 having a spacer sleeve 191 thereon. The upper ends of the bars 186 and 187 are also penetrated by a bolt 192 on which the rear end of the bar 136 of the frame 35 is pivotally mounted.

In operation, as the implement is raised from a position such as that shown in Figure 3 to the position shown in Figure 1, the hydraulic ram 71 moves upwardly thus moving the transverse bar 72 upwardly and this will raise the booms B and B' comprising the bars 101, 102, 103 and 104 upwardly at their rearmost ends and will also move the front end of the bar 136 upwardly to thus raise the implement connected thereto. The means for raising and lowering the hydraulic ram 71 having been described, a further description is deemed unnecessary.

By referring to Figure 14 there may be observed a means for connecting the plow P to the rear end of the frame structure 35 which is very similar to that which is shown in Figure 4, and where like parts are shown, the same reference characters will apply to the parts shown in Figure 14 as apply to the parts shown in Figure 4 with the exception that the transverse bar 175 will bear the numeral 175a in Figure 14, due to the transverse bar 175a being shaped differentially from the bar 175.

While the opposite ends of the transverse bar 175 in Figure 4 are bent upwardly and outwardly so they are disposed on the same longitudinal axis and in the same horizontal plane, the transverse bar 175a shown in Figure 14 is offset at opposite ends thereof, the right-hand end being bent upwardly and outwardly as at 195 and the left-hand end thereof being bent downwardly and outwardly as at 196 and these outwardly bent portions 195 and 196 are disposed on the same inclined longitudinal axis, but at different heights.

These portions 195 and 196 are oscillatably mounted in the rearmost ends of the booms B and B' in the same manner in which the opposite ends of the transverse bar 175 in Figure 4 are mounted in the rearmost ends of the booms B and B'.

One of the features of this lifting apparatus is that the rear ends of the booms B and B' will move upwardly faster than the transverse bar 72 to which the longitudinally extending bar 136 is connected, due to the mechanical advantage of the booms relative to the ram 71, and therefore as the implement is lifted from engagement with the earth, the angle at which the plow share 183, in the instance of the plow P, engages the earth would be decreased, thus permitting the implement to be raised and to therefore slide upwardly out of the earth as it is being raised upwardly and to therefore decrease resistance to forward motion of the tractor, and thus the implement does not have a tendency to dig into the ground.

In other words, as the lower the rearmost ends of the booms B and B' drop, the steeper the angle at which the pointed portion of the implement is disposed, thus forcing the pointed portion to dig deeper into the earth and when the implement is moved upwardly, the portion of the blade of the implement which is rearwardly of the pointed portion will move upwardly at a slower rate than the pointed portion thus causing the bladed portion of the implement to be tipped rearwardly.

The effect that this feature has in the instance of a grading implement, such as shown in Figure 1, is to cause the lower edge of the blade 140 to move forwardly and upwardly at a faster rate than the upper edge of the blade 140, thereby causing the blade to be tilted rearwardly at its upper end and to thereby prevent the dirt which has been scooped up by the blade 140 from spilling out or sliding off from the blade as quickly as it would do so in the event that the angularity of the blade 140 remained the same throughout its upward and downward movement.

Obviously, the implement lift as described may be used for many other types of implements than those shown in the drawings and an implement lift of this type may be connected to truck tractors as well as farm tractors or any other desired type of tractor, the implements and tractor being shown by way of illustration only.

The purpose of these offset portions 195 and 196 integral with the bar 175a is so that the left wheel of the tractor may ride in the furrows that may have already been formed by the plow P and the right-hand wheel of the tractor would ride on that part of the ground which has not been plowed and therefore the axis of the rear wheels of the tractor would be disposed on somewhat of an angle and would cause the rearmost ends of the booms B and B' to be disposed in substantially the position shown in Figure 14 which, in the event of using the type of bar 175 as shown in Figure 4, would cause the plow to be disposed at an angle relative to the ground and, in the event of the bar 175a, the plow would still be disposed in a substantially vertically disposed position while it is being pulled over the ground by the tractor in a plowing operation.

The bars 160, 161, and links 164 and 165 in Figures 1 and 2 and the lever bars 186 and 187 in Figures 13 and 14 in each instance form a cantilevered portion, which with the link 136, in both forms causes the implement frame to be raised and lowered as described, by the raising and lowering of the booms B and B'.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In combination with a tractor having a rear axle assembly and driving wheels mounted on opposite ends of the rear axle assembly, a rigid frame secured to the rear end of the tractor and extending rearwardly therefrom and being disposed between the rear wheels of the tractor, guide members secured to the rear end of the fixed frame, a hydraulic cylinder disposed between the guide members, a piston mounted for vertical sliding movement in the cylinder, a transverse bar secured to the upper end of the vertically movable piston, said transverse bar extending to and having vertical sliding movement in the guide members, a boom pivotally mounted on each side of the frame forwardly of the guide members and the free ends of the same extending a substantial distance rearwardly of the guide members, a link connection between an intermediate portion of each of the booms and the transverse bar, an earthworking implement frame, means for pivotally securing the front end of the earthworking implement frame to the rearmost ends of the booms, a cantilevered portion rising from the front end of the implement frame, a link pivotally connected to the upper end of the cantilevered portion and said transverse bar, a source of hydraulic power connected to the lower end of the cylinder and manually controlled means for admitting hydraulic fluid under pressure to the lower end of the cylinder for raising the vertically movable piston to thereby raise the rear ends of the booms for raising the implement frame connected thereto and manually operable means for releasing the hydraulic fluid under pressure from the cylinder thereby permitting the booms and the associated implement frame to move downwardly by gravity.

2. In combination with a tractor having a longitudinally extending frame and a rear axle housing and having driving wheels disposed at each end of the rear axle housing, a fixed frame secured below the longitudinally extending frame of the tractor and extending rearwardly therefrom, a hydraulic cylinder secured to the fixed frame, said fixed frame having guide members secured thereto and disposed on each side of the hydraulic cylinder, a piston mounted for vertical sliding movement in the hydraulic cylinder, a transverse bar mounted on the upper end of the piston and extending through the guide members at each side thereof, a pair of booms pivotally connected at their front ends to the front end of the rearwardly extending fixed frame, a pair of link members having their upper ends connected to the ends of the transverse bar secured to the upper end of the piston, said link members extending downwardly and being pivotally connected intermediate the ends of each of the booms, a rearwardly extending link pivotally connected at its front end to the transverse bar intermediate its ends, an earthworking implement frame having an implement thereon, means for pivotally connecting the front end of the implement frame to the rearmost ends of the booms, an upwardly extending cantilevered portion secured to the implement frame adjacent the front end thereof, and means for pivotally connecting the rear end of the rearwardly extending link, which is connected to the transverse bar, to the upper end of the cantilevered portion, said tractor having a source of hydraulic pressure mounted thereon, manually controlled means for admitting hydraulic pressure to the lower end of the cylinder thereby moving the associated piston upwardly and whereby due to the movement of the rear ends of the booms about their pivot points, relative to the movement of the rearwardly extending link between the cantilevered portion on the implement frame and the transverse bar, the front end of the implement will be caused to move upwardly at a greater speed than the rear end of the implement, thus decreasing the angle at which the implement digs into the earth upon forward motion of the tractor.

3. In a structure according to claim 2, a flexible connection between the medial portion of the booms and the fixed frame to thereby prevent excessive lateral sway in the booms and the associated implement frame during transit while the hydraulic piston and associated parts are in a raised position.

4. In combination with a tractor having a longitudinally extending frame and a rear axle housing and having driving wheels disposed at each end of the rear axle housing, a fixed frame secured below the longitudinally extending frame of the tractor and extending rearwardly therefrom, a vertically disposed hydraulic cylinder secured to the fixed frame, said fixed frame having a pair of vertically disposed guide members secured thereto, one guide member being disposed on each side of the hydraulic cylinder, a piston mounted for vertical sliding movement in the hydraulic cylinder, a transverse bar mounted on the upper end of the piston and extending through the guide members at each side thereof, a pair of booms pivotally connected to the front end of the rearwardly extending fixed frame, a link member secured to each end of the transverse bar secured to the upper end of the piston, said link members extending downwardly and being pivotally connected intermediate the ends of each of the booms, a rearwardly extending link having its front end pivotally connected to the transverse bar intermediate its ends, an implement frame provided with an earthworking implement and having its front end pivotally connected to the rear ends of the booms and having an uprising cantilevered portion secured to its front end, a pivotal connection between the upper end of the cantilevered portion and the rear end of the rearwardly extending link, said tractor having a source of hydraulic pressure mounted thereon, manually controlled means for admitting hydraulic fluid to the lower end of the cylinder under pressure thereby moving the associated piston upwardly and whereby due to the movement of the rear ends of the booms about their pivot points, relative to the movement of the rearwardly extending link pivotally connected to the upper end of the cantilevered portion at its rear end and to the transverse bar at its front end, the forward edge of the implement will be caused to move forwardly and upwardly at a greater speed than the rear portion of the implement, thus decreasing the angle at which the implement digs into the earth as the implement is raised upwardly upon forward movement of the tractor.

5. Hydraulic lift means for a tractor having a hydraulic pump comprising a fixed frame secured at its forward end to the rear end of the tractor, vertically movable hydraulic lift means mounted in the fixed frame, a boom disposed on each side of the fixed frame and having their front ends pivotally secured to the fixed frame, a connection between the hydraulic lift means and a medial portion of the booms, an implement frame having its front end pivotally secured to the rear ends of the booms, an uprising cantilevered portion rigidly secured to the front end of the implement frame, a pivoted link connection between the upper end of the cantilevered portion and the upper portion of the connection between the hydraulic lift means and the medial portions of the booms, and manually operable means for admitting liquid from the hydraulic pump to the hydraulic lift means to raise the rear ends of the booms.

6. In a structure according to claim 5 in which said cantilevered portion comprises a lever bar rigidly secured at its lower end to the front end of the implement frame.

7. Hydraulic lift means for a tractor having a hydraulic pump comprising a fixed frame secured at its forward end to the rear end of the tractor, vertically movable hydraulic lift means mounted in the fixed frame, a boom disposed on each side of the fixed frame and having its front end pivotally secured to the fixed frame, a connection between the hydraulic lift means and a medial portion of the booms, an implement frame having its front end pivotally secured to the rear ends of the booms, an uprising lever bar rigidly secured to the front end of the implement frame, a pivoted link connection between the upper end of the lever bar and the connection between the hydraulic lift means and the medial portions of the booms, and manually operable means for admitting liquid from the hydraulic pump to the hydraulic lift means to raise the rear ends of the booms.

8. Hydraulic lift means for a tractor having a hydraulic pump comprising a fixed frame secured at its forward end to the rear end of the tractor, vertically movable hydraulic lift means mounted in the fixed frame, a boom disposed on each side of the fixed frame and having their front ends pivotally secured to the fixed frame, a connection between the hydraulic lift means and a medial portion of the booms, an implement frame having its front end pivotally secured to the rear ends of the booms, an uprising cantilevered portion rigidly secured to the front end of the implement frame, a pivoted link connection between the upper end of the cantilevered portion and the connection between the hydraulic lift means and the medial portions of the booms, and manually operable means for admitting liquid from the hydraulic pump to the hydraulic lift means to raise the rear ends of the booms, said cantilevered portion comprising a pair of diverging bars secured at their lower ends to the front end of the implement frame and having their upper ends disposed adjacent each other, a pair of links having their lower ends secured to a medial portion of the implement frame and extending upwardly and forwardly to a point adjacent the upper ends of the diverging bars and a bolt penetrating the pair of links and the diverging bars and said link connection with the upper portion of the fixed frame.

JESSE C. HAWKINS.

REFERENCES CITED

The following references are of record in the file of this patent:

UNITED STATES PATENTS

| Number | Name | Date |
|---|---|---|
| 1,419,014 | Burtnett | June 6, 1922 |
| 2,198,196 | Goldup | Apr. 23, 1940 |
| 2,440,550 | Martin | Apr. 27, 1948 |
| 2,456,693 | Fraga | Dec. 21, 1948 |